US011777958B2

(12) United States Patent
Rasovic

(10) Patent No.: US 11,777,958 B2
(45) Date of Patent: *Oct. 3, 2023

(54) METHODS, SYSTEMS, AND MEDIA FOR DETECTING NEW MALICIOUS ACTIVITY FROM IOT DEVICES

(71) Applicant: McAfee, LLC, San Jose, CA (US)

(72) Inventor: Sasa Rasovic, Aalsmeer (NL)

(73) Assignee: McAfee, LLC, San Jose, CA (US)

( * ) Notice: Subject to any disclaimer, the term of this patent is extended or adjusted under 35 U.S.C. 154(b) by 231 days.

This patent is subject to a terminal disclaimer.

(21) Appl. No.: 17/087,418

(22) Filed: Nov. 2, 2020

(65) Prior Publication Data
US 2021/0051164 A1    Feb. 18, 2021

Related U.S. Application Data

(63) Continuation of application No. 16/045,004, filed on Jul. 25, 2018, now Pat. No. 10,826,918.

(51) Int. Cl.
*H04L 29/06* (2006.01)
*H04L 29/08* (2006.01)
(Continued)

(52) U.S. Cl.
CPC ........ *H04L 63/1416* (2013.01); *H04L 63/101* (2013.01); *H04L 63/102* (2013.01);
(Continued)

(58) Field of Classification Search
CPC ............ H04L 63/1416; H04L 63/1458; H04L 63/101; H04L 63/102; H04L 67/12; H04L 67/2833; H04L 63/20
(Continued)

(56) References Cited

U.S. PATENT DOCUMENTS 9,600,571 B2    3/2017  Shaashua et al.
10,623,497 B2    4/2020  Thaler et al.
(Continued)

OTHER PUBLICATIONS

Threat analysis and attacks modelling in routing towards IoT, Lokulwar et al, Feb. 2017 (Year: 2017).*

(Continued)

*Primary Examiner* — Jahangir Kabir
(74) *Attorney, Agent, or Firm* — Byrne Poh LLP

(57) ABSTRACT

Methods, systems, and media for detecting malicious activity from user devices are provided. In some embodiments, a method for detecting malicious activity from user devices is provided, the method comprising: receiving information indicating a requested connection to a destination by a first user device; adding the received information to information received from a plurality of user devices to generate aggregated connection information; determining that the requested connection to the destination by the first user device is part of an attack, wherein determining that the requested connection to the destination by the first user device is part of the attack on the destination comprises determining that more than a predetermined percentage of user devices have requested connections to the destination; receiving information indicating a requested connection to the destination by a second user device; and causing the connection to the destination by the second user device to be blocked.

21 Claims, 4 Drawing Sheets

(51) Int. Cl.
  *H04L 9/40* (2022.01)
  *H04L 67/12* (2022.01)
  *H04L 67/566* (2022.01)

(52) U.S. Cl.
  CPC .......... *H04L 63/1458* (2013.01); *H04L 67/12* (2013.01); *H04L 67/566* (2022.05); *H04L 63/20* (2013.01)

(58) Field of Classification Search
  USPC .......................................................... 726/23
  See application file for complete search history.

(56) References Cited

U.S. PATENT DOCUMENTS

| | | | |
|---|---|---|---|
| 10,701,103 | B2 | 6/2020 | Aggarwal et al. |
| 10,826,918 | B1 * | 11/2020 | Rasovic .............. H04L 63/1416 |
| 11,095,717 | B2 * | 8/2021 | Gkoufas ................. H04L 67/12 |
| 2016/0127406 | A1 | 5/2016 | Smith et al. |
| 2016/0149942 | A2 * | 5/2016 | Niemela ............ H04L 63/1466 |
| | | | 726/23 |
| 2016/0205134 | A1 | 7/2016 | Smith et al. |
| 2018/0159894 | A1 | 6/2018 | Reddy et al. |
| 2019/0230126 | A1 | 7/2019 | Kumar et al. |
| 2019/0268370 | A1 | 8/2019 | Ogrinz et al. |
| 2020/0028821 | A1 | 1/2020 | Weisshaupt et al. |

OTHER PUBLICATIONS

Notice of Allowance dated Aug. 24, 2020 in U.S. Appl. No. 16/045,004, pp. 2-6.
Office Action dated Mar. 23, 2020 in U.S. Appl. No. 16/045,004, pp. 2-12.

\* cited by examiner

METHODS, SYSTEMS, AND MEDIA FOR DETECTING NEW MALICIOUS ACTIVITY FROM IOT DEVICES

CROSS-REFERENCE TO RELATED APPLICATION

This application is a continuation of U.S. patent application Ser. No. 16/045,004, filed Jul. 25, 2018, which is hereby incorporated by reference herein in its entirety.

TECHNICAL FIELD

The disclosed subject matter relates to methods, systems, and media for detecting new malicious activity from IoT devices.

BACKGROUND

There has been a massive growth in the number and type of Internet of Things (IoT) devices. For example, many people now have IoT devices such as smart appliances, smart media playback devices, smart cameras, etc. within their homes that can connect to the Internet. However, IoT devices can be commandeered to launch malicious attacks, such as Distributed Denial of Service (DDoS) attacks, or to launch worms or other malicious activity. It can be difficult to detect that an IoT device has been infected or commandeered. For example, in some cases, a malicious actor can create a distributed attack by commandeering many different IoT devices to attack a particular destination in a DDoS attack. In such cases, the distributed nature of the attack can make the attack difficult to quickly detect.

Accordingly, it is desirable to provide new methods, systems, and media for detecting new malicious activity from IoT devices.

SUMMARY

Methods, systems, and media for detecting malicious activity from user devices are provided. In accordance with some embodiments of the disclosed subject matter, a method for detecting malicious activity from user devices is provided, the method comprising: receiving, at a first time point, information indicating a first requested connection to a destination by a first user device, wherein the information indicates at least an identifier of the destination and information about the first user device; adding the received information to information received from a plurality of user devices not including the first user device indicating a corresponding plurality of requested connections to a plurality of destinations to generate aggregated connection information; determining, using the aggregated connection information, that the requested connection to the destination by the first user device is part of an attack on the destination, wherein determining that the requested connection to the destination by the first user device is part of the attack on the destination comprises determining that more than a predetermined percentage of user devices in the plurality of user devices have requested connections to the destination within a time window; adding the destination to a group of blocked destinations; receiving, at a second time point, information indicating a second requested connection to the destination by a second user device; and causing the connection to the destination by the second user device to be blocked based on the inclusion of the destination in the group of blocked destinations.

In accordance with some embodiments of the disclosed subject matter, a system for detecting malicious activity from user devices is provided, the system comprising: a memory; and a hardware processor coupled to the memory that is configured to: receive, at a first time point, information indicating a first requested connection to a destination by a first user device, wherein the information indicates at least an identifier of the destination and information about the first user device; add the received information to information received from a plurality of user devices not including the first user device indicating a corresponding plurality of requested connections to a plurality of destinations to generate aggregated connection information; determine, using the aggregated connection information, that the requested connection to the destination by the first user device is part of an attack on the destination, wherein determining that the requested connection to the destination by the first user device is part of the attack on the destination comprises determining that more than a predetermined percentage of user devices in the plurality of user devices have requested connections to the destination within a time window; add the destination to a group of blocked destinations; receive, at a second time point, information indicating a second requested connection to the destination by a second user device; and cause the connection to the destination by the second user device to be blocked based on the inclusion of the destination in the group of blocked destinations.

In accordance with some embodiments of the disclosed subject matter, a non-transitory computer-readable medium containing computer-executable instructions that, when executed by a processor, cause the processor to perform a method for detecting malicious activity from user devices is provided, the method comprising: receiving, at a first time point, information indicating a first requested connection to a destination by a first user device, wherein the information indicates at least an identifier of the destination and information about the first user device; adding the received information to information received from a plurality of user devices not including the first user device indicating a corresponding plurality of requested connections to a plurality of destinations to generate aggregated connection information; determining, using the aggregated connection information, that the requested connection to the destination by the first user device is part of an attack on the destination, wherein determining that the requested connection to the destination by the first user device is part of the attack on the destination comprises determining that more than a predetermined percentage of user devices in the plurality of user devices have requested connections to the destination within a time window; adding the destination to a group of blocked destinations; receiving, at a second time point, information indicating a second requested connection to the destination by a second user device; and causing the connection to the destination by the second user device to be blocked based on the inclusion of the destination in the group of blocked destinations.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
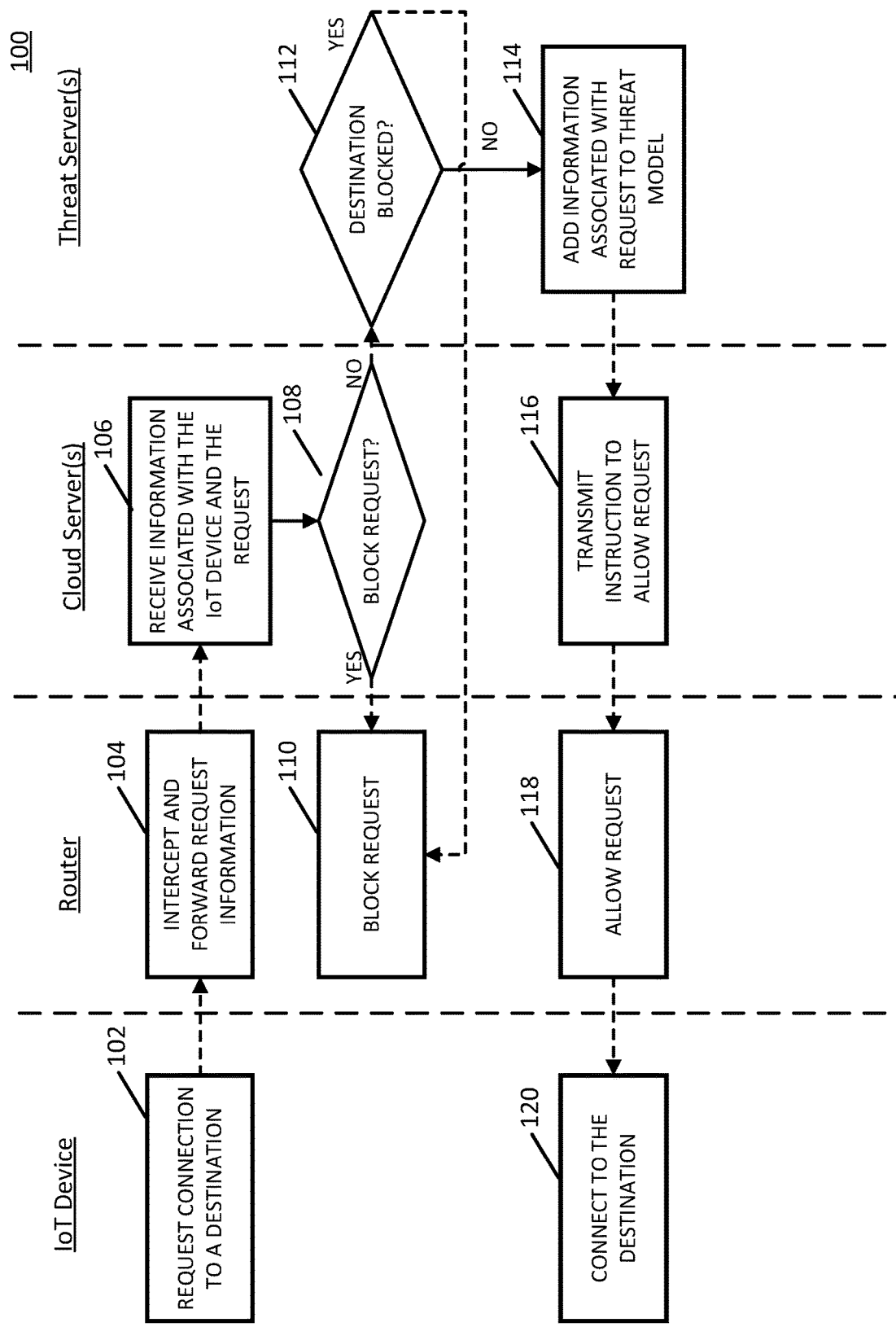
FIG. 1 shows an example of an information flow diagram for determining whether a request from an IoT device is to be blocked in accordance with some embodiments of the disclosed subject matter.

In accordance with various embodiments, mechanisms (which can include methods, systems, and media) for detecting new malicious activity from IoT devices are provided.

In some embodiments, the mechanisms described herein can be used to detect new malicious activity from Internet of Things (IoT) devices. For example, in some embodiments, the malicious activity can include propagation of a virus or worm, participation in a Distributed Denial of Service (DDoS) attack, and/or any other suitable activity. As a more particular example, in some embodiments, the mechanisms described herein can be used to determine that IoT devices in a group of IoT devices have been commandeered to attack a particular destination. Note that, in some embodiments, IoT devices can include any suitable type of IoT devices, such as smart thermostats, smart appliances (e.g., smart lighting systems, smart kitchen appliances, smart washer/dryers, and/or any other suitable appliances), smart media systems (e.g., a television, a speaker, a streaming media device, a virtual assistant device, and/or any other suitable media device), a smart security system, and/or any other suitable device capable of connecting to a network to transmit and receive data.

In some embodiments, the mechanisms described herein can detect a new attack utilizing IoT devices by detecting anomalous activity by IoT devices participating in the attack. For example, in an instance of a DDoS attack, the mechanisms described herein can detect that multiple IoT devices participating in the DDoS attack (e.g., that have been commandeered to attack a particular site) have all requested connection to a particular site within a predetermined time period (e.g., in the past hour, in the past two hours, and/or over any other suitable time period). In some embodiments, the mechanisms can determine that activity by a group of IoT devices is anomalous based on any suitable information. For example, in some embodiments, the mechanisms can determine that a particular requested site is an unlikely destination for particular types of IoT devices (e.g., lighting devices, thermostats, and/or any other suitable types of IoT devices) that have requested connection to the particular site. As another example, in some embodiments, the mechanisms can determine that more than a predetermined percentage of IoT devices associated with a particular Internet Service Provider (ISP) have requested connection to a particular site within a predetermined time window (e.g., within the past hour, within the past two hours, and/or in any other suitable time window). In some embodiments, the mechanisms described herein can determine baseline activity by IoT devices that represents normal or typical requested network connections by IoT devices, and can identify anomalous activity by a group of IoT devices by identifying a deviation from the baseline activity. In some embodiments, the mechanisms described herein can quantify a likelihood that detected activity represents a malicious attack by generating a threat score based on any suitable metrics, as described below in more detail in connection with FIG. 2.

Note that, in some embodiments, the mechanisms described herein can detect new and/or previously unknown large-scale attacks. For example, in some embodiments, the mechanisms described herein can be used to detect a new large-scale attack, which can include creation of a new botnet, new malware, a new virus outbreak, a new distributed attack, such as a new DDoS attacks that have not previously been identified and/or previously subjected to analysis. In some embodiments, a newly detected malicious attack can then be added to a list or group of known malicious attacks. In some such embodiments, a subsequent attempt to access a known malicious domain can then be automatically denied.

In some embodiments, the mechanisms described herein can perform any suitable action(s) in response to detecting malicious activity by IoT devices. For example, in some embodiments, the mechanisms described herein can cause a router through which an IoT device participating in malicious activity is connected to a network to quarantine or otherwise block the IoT device. As another example, in some embodiments, the mechanisms described herein can cause a message to be presented to a user associated with an IoT device participating in malicious activity (e.g., to indicate that the IoT device has been infected with malware, to indicate that the IoT device has been commandeered to participate in a DDoS attack, and/or to indicate any other suitable information). As yet another example, in some embodiments, the mechanisms described herein can alert one or more ISPs associated with IoT devices participating in the malicious activity that malicious activity has been detected. Note that, in some embodiments, the mechanisms described herein can cause routers associated with IoT devices determined to potentially be participating in malicious activity to collect additional data related to the IoT devices to determine whether the potential malicious activity is a confirmed attack.

In some embodiments, the mechanisms described herein can aggregate information relating to connection requests by different IoT devices in any suitable manner. For example, in some embodiments, each IoT device can be connected to a router that is associated with a security service. In some such embodiments, a router that is associated with a security service can transmit information relating to requests by IoT devices connected to the router to connect to different destinations to one or more servers associated with the security service. For example, as described below in connection with FIG. 1, in some embodiments, a router can transmit information related to a request by an IoT device to a cloud server which can aggregate information related to any suitable number of IoT devices (e.g., a million IoT devices, ten million IoT devices, and/or any other suitable number). In some embodiments, a cloud server can determine whether a request to connect to a particular destination by a particular IoT device is to be blocked, for example, based on whether a user associated with the router has created a security policy that indicates the connection to the destination is to be blocked, as described below in connection with FIG. 1. Additionally or alternatively, in some embodiments, a cloud server can forward information related to a request to connect to a particular destination by a particular IoT device to a threat server (e.g., as shown in and described below in connection with FIGS. 1 and 3), which can aggregate information from multiple requests from multiple IoT devices to generate a model for detecting malicious activity. Note that, in some embodiments, information forwarded from a cloud server and/or a router connected to a particular device to a threat server can include any suitable information, such as device information (e.g., a type of device associated with the device, whether the device is an IoT device, network information associated with the device, information relating to a connection request made by the device, and/or any other suitable information, as described in more detail in connection with FIGS. 1 and 2).

Note that, in some embodiments, in instances where each IoT device is connected to a router associated with a particular security service, a user of the security service can configure settings associated with the security service in any suitable manner. For example, in some embodiments, a user of a security service can configure settings associated with the security service via an application executing on a user device of the user (e.g., a mobile phone, a tablet computer, a laptop computer, a desktop computer, and/or any other suitable user deice) or via a user account associated with the user and the security service. In some embodiments, settings associated with a security service can include any suitable settings. For example, in some embodiments, a user of a security service can indicate particular destinations (e.g., particular websites, particular domains, and/or any other suitable type of destinations) that are to be blocked by a router associated with the security service, particular destinations that are not to be accessed during particular times of the day or particular days of the week (e.g., on weeknights after 10 p.m., between 10 p.m. and 6 a.m., and/or any other suitable times of day or days of the week), and/or any other suitable user-specified settings. As a more particular example, in some embodiments, the settings can indicate that particular devices (e.g., a particular mobile device, a particular media device, and/or any other suitable device) are to be blocked from accessing particular sites (e.g., particular media content sharing sites, particular social networking sites, and/or any other suitable sites). In some embodiments, settings specified by a user in association with a security service can be stored as a policy that can be enforced by a router associated with the security service, one or more servers associated with the security service, and/or by any other suitable device. More detailed techniques for enforcing user-specified settings are described below in connection with FIG. 1.

In some embodiments, the mechanisms described herein can be used to improve computer security by rapidly detecting malicious network activity, such as malware, a worm, a DDoS attack, etc. For example, the mechanisms described herein can detect anomalous network activity by devices (e.g., an anomalous number of requests to connect to a particular destination from a group of devices, and/or any other suitable anomalous activity) rapidly by continually comparing network activity to a baseline of expected activity. In some embodiments, the mechanisms described herein can detect that particular devices have been infected by malware or have been commandeered to participate in an attack based on participating of the devices in anomalous network activity, and can cause the devices to be quarantined or otherwise blocked, thereby slowing or stopping propagation of the malware or the attack.

Turning to FIG. 1, an example 100 of an information flow diagram for determining whether a connection request from an IoT device is to be blocked is shown in accordance with some embodiments of the disclosed subject matter. In some embodiments, blocks of process 100 can be implemented on an IoT device, a router through which the IoT device connects to a network, one or more cloud server(s), and/or one or more threat server(s), as illustrated in FIG. 1.

At 102, the IoT device can request a connection to a destination. In some embodiments, the IoT device can be any suitable type of IoT device, such as a smart appliance (e.g., a smart thermostat, a smart kitchen appliance, a smart washer/dryer, and/or any other suitable type of appliance), a smart media player (e.g., a television, a speaker, a DVR, and/or any other suitable type of media player), a smart camera, and/or any other suitable type of IoT device. In some embodiments, the destination can be any suitable destination, such as a particular website (e.g., www.something.com, and/or any other suitable site), a particular social networking service, a particular video sharing service, a particular domain, a particular IP address, and/or any other suitable destination.

At 104, the router can intercept the request and can forward information associated with the intercepted request to the cloud server(s). Note that, in some embodiments, the information associated with the intercepted request can include any suitable information. For example, in some embodiments, the information can include information about the requested destination (e.g., a domain name, an IP address, and/or any other suitable information relating to the requested destination), information about the IoT device (e.g., a Media Access Control, or MAC, address of the IoT device, an Internet Protocol, or IP, address of the IoT device, a type of device associated with the IoT device, a vendor of the IoT device, and/or any other suitable information about the IoT device), a time stamp indicating a time at which the IoT device requested connection to the destination, and/or any other suitable information.

Note that, in some embodiments, the router can be associated with any suitable security service. For example, in some embodiments, the router can be associated with a security service provided by an ISP used by the router and/or by any suitable business or organization that provides security services. In some embodiments, the security service can provide any suitable services, such as determining whether the destination requested by the IoT device at 102 is to be blocked (e.g., based on the destination being blocked based on user-specified restrictions as described below in connection with 108, based on the destination being on a list of blacklisted sites as described below in connection with 112, and/or based on any other suitable information), analyzing activity by multiple IoT devices to determine a likelihood that the activity is anomalous and/or is part of a malicious attack, and/or performing any other suitable function(s). In some embodiments, the security service can perform functions described herein as performed by the one or more cloud servers and/or the one or more threat servers.

Additionally, note that, in some embodiments, a user associated with the router (e.g., an administrator of a network associated with the router, an owner of the router, and/or any other suitable user) can configure any suitable settings associated with the security service associated with the router. For example, in some embodiments, settings can include parental controls (e.g., that specify times of day or times of the week at which particular devices connected to the router are not allowed Internet access, and/or any other suitable parental controls), blocked sites that are not to be connected to via the router, and/or any other suitable user-specified settings, which are described below in more detail in connection with 108.

At 106, the cloud server(s) can receive information associated with the IoT device and the request to connect to the destination from the router. For example, in some embodiments, the cloud server(s) can receive any suitable information associated with the IoT device, such as a type of device (e.g., that the device is a smart thermostat, a media player, and/or any other suitable type of device), a model number of the device, a vendor of the device, network information associated with the device (e.g., a MAC number, an IP address, and/or any other suitable network information) and/or any other suitable device information. As another example, in some embodiments, the cloud server(s) can receive any suitable information associated with the destination site, such as an IP address associated with the destination site, a DNS associated with the destination site, and/or any other suitable information.

Note that, in some embodiments, a particular cloud server can receive information relating to requests to connect to destinations from any suitable number of IoT devices (e.g., one million IoT devices, ten million IoT devices, and/or any other suitable number). In some embodiments, the information can be received from any suitable number of routers, each associated with a security service that the cloud server is also associated with. In some embodiments, a particular cloud server can receive information from routers that are all associated with the same ISP. Alternatively, in some embodiments, a particular cloud server can receive information from routers that are associated with different ISPs.

At 108, the cloud server(s) can determine whether the request by the IoT device to connect to the destination is to be blocked. In some embodiments, the cloud server(s) can determine whether the request by the IoT device to connect to the destination is to be blocked based on user-specified restrictions. For example, as described above in connection with 104, the user-specified restrictions can be settings configured by a user associated with the router to block particular network traffic. As a more particular example, the cloud server(s) can determine whether the destination is on a list of sites that are to be blocked. As another more particular example, the cloud server(s) can determine whether connection to the destination is to be blocked based on a user-specified policy, such as parental controls. As a specific example, in some embodiments, parental controls can specify that specific sites are to be blocked, that specific sites are to be blocked on particular days of the week or during particular times of day (e.g., after 10 p.m., on weeknights, between 6 p.m. and 6 a.m. on weeknights, and/or any other suitable combination of days and times), that specific sites are to be blocked from access by specific IoT devices (e.g., that a particular media device is to be blocked from accessing a particular media content sharing site, and/or any other suitable specific device and site restriction(s)), and/or any other suitable controls. As yet another more particular example, a user-specified policy can indicate that particular categories of destination sites are to be blocked, such as sites associated with streaming media content, sites associated with gambling, and/or any other suitable type of sites. Note that, in some embodiments, user-specified restrictions can be received by the cloud server(s) in any suitable manner. For example, in some embodiments, user-specified restrictions can be indicated in an application executing on a device of a user associated with the router (e.g., an administrator of a network the router is connected to, an owner of the router, and/or any other suitable user) and/or via a user account associated with the user and a security service associated with the router and/or the cloud server(s).

In some embodiments, the cloud server(s) can determine whether the request by the IoT device to connect to the destination is to be blocked based on any other suitable information or criteria. For example, in some embodiments, the cloud server(s) can determine whether the destination is a known malicious destination, and, in response to determining that the requested destination is a known malicious destination, can determine that the request is to be blocked.

If, at 108, the cloud server(s) determines that the connection to the destination is to be blocked based on user-specified restrictions ("yes" at 108), the cloud server(s) can transmit an instruction to the router to block the request. The router can then block the request to access the destination by the IoT device at 110. In some embodiments, the router can additionally cause any suitable message to be presented, for example, a message that the destination has been blocked based on a particular user-specified restriction (e.g., that the destination is associated with a site of a particular category, that the site is not to be accessed at particular times, and/or any other suitable type of restriction), and/or any other suitable message. In some embodiments, the message can be presented on any suitable device, such as the IoT device (e.g., in instances where there is a display associated with the IoT device), a mobile device that is paired with the IoT device, and/or any other suitable type of user device.

If, at 108, the cloud server(s) determine that the connection to the destination is not to be blocked based on user-specified restrictions ("no" at 108), the cloud server(s) can forward the information associated with the IoT device and/or the request to connect to the destination to the threat server. At 112, the threat server can determine whether the destination is to be blocked. For example, in some embodiments, the threat server can determine whether the destination is to be blocked based on whether the destination is included on a list of blacklisted sites. As a more particular example, in some embodiments, the blacklisted list of sites can include any websites that are known to be malicious websites and/or associated with malicious activity. As another more particular example, in some embodiments, the blacklisted list of sites can include any destinations or sites that have been identified as targets of a Denial of Service (DOS) attack or a DDoS attack. Additionally or alternatively, in some embodiments, the threat server can determine whether an IP address associated with the destination is included in a list of IP ranges known to be associated with malicious activity.

If, at 112, the threat server determines that the destination is to be blocked ("yes" at 112), the threat server can transmit an instruction to the router that causes the router to block connection to the destination. The router can then block the request to connect to the destination at 110. Note that, in some embodiments, the instruction to the router to block connection to the destination can be transmitted via the cloud server(s).

If, at 112, the threat server determines that the destination is not to be blocked ("no" at 112), the threat server can add information associated with the request to connect to the destination to a threat model at 114. In some embodiments, the threat server can continuously aggregate information relating to requests to access different destinations from multiple IoT devices (e.g., millions of IoT devices, and/or any other suitable number) associated with multiple ISPs (e.g., five ISPs, ten ISPs, and/or any other suitable number), and can generate and update a model that can be used to detect an ongoing malicious attack. As a more particular example, in some embodiments, the request to access the destination can be added to a model that is used to identify an anomalous group of requests by IoT devices that is indicative of a malicious attack (e.g., infection by malware of the IoT devices, that the IoT devices have been commandeered in a DDoS attack, and/or any other suitable type of attack). As a specific example, in some embodiments, the request to access the destination site can be added to a model that indicates an increase in multiple IoT devices all trying to access a particular destination that is unlikely to be an appropriate destination for the IoT devices within a particular time window, thereby indicating an attack on the destination. More detailed techniques for a threat server to generate a threat model based on requests from IoT devices is shown in and described below in connection with FIG. 2.

At 116, the cloud server(s) can transmit an instruction to the router indicating that the request is to be allowed.

At 118, the router can allow the connection to the destination.

At 120, the IoT device can connect to the requested destination via the router.

Note that, in some embodiments, the IoT device can be allowed to connect to the destination (e.g., at 120), and, subsequently, the threat server can determine that the request by the IoT device to connect to the destination was part of malicious activity. For example, in some embodiments, the threat server can determine that the request to connect to the destination is part of a DDoS attack on the destination. In some such embodiments, the threat server can then add the destination to the blacklisted destinations described above in connection with 112. In some embodiments, the threat server can then prevent other IoT devices from connecting to the destination in future requests, thereby slowing or stopping the DDoS attack on the destination.

Figure 2:
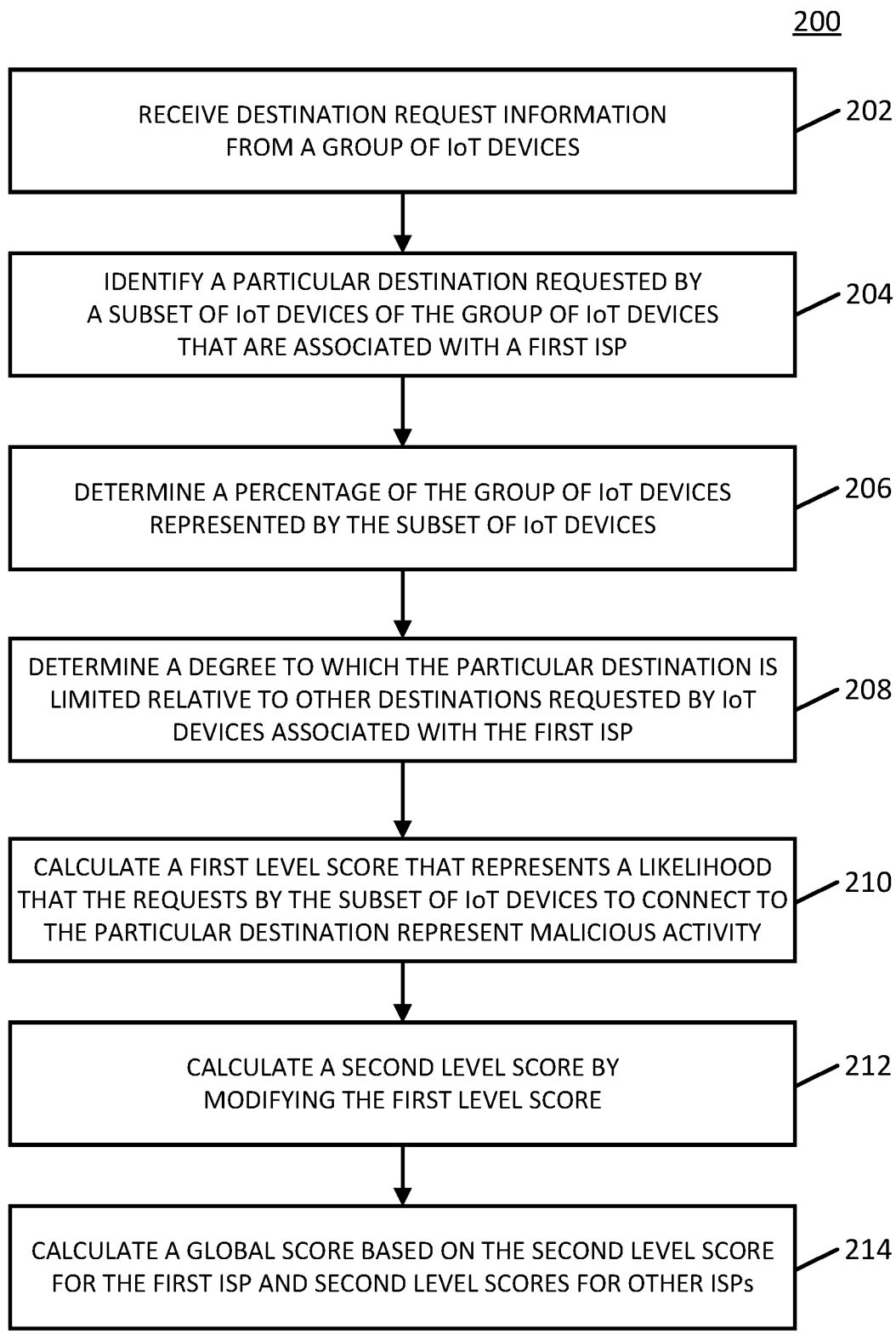
FIG. 2 shows an example of a process for determining a threat score associated with activity from IoT devices in accordance with some embodiments of the disclosed subject matter.

Turning to FIG. 2, an example 200 of a process for determining a threat score associated with activity from IoT devices is shown in accordance with some embodiments of the disclosed subject matter. In some embodiments, blocks of process 200 can be executed by one or more threat servers, as shown in and described below in connection with FIG. 3.

Process 200 can begin at 202 by receiving destination request information from a group of IoT devices. In some embodiments, the request information can include information associated with individual requests by individual IoT devices to access particular destinations. For example, in some embodiments, information associated with an individual request can include information about an IoT device that made the request (e.g., a MAC address associated with the IoT device, an IP address associated with the IoT device, a type of device associated with the IoT device, a vendor associated with the IoT device, and/or any other suitable information about the IoT device), information about a destination requested by the IoT device (e.g., a domain name associated with the destination, a DNS associated with the destination, an IP address associated with the destination, and/or any other suitable information about the destination), a time stamp indicating a time at which the request was made by the IoT device, and/or any other suitable information.

In some embodiments, process 200 can receive the request information from any suitable number of IoT devices (e.g., one million, five million, ten million, and/or any other suitable number). In some embodiments, each IoT device can be associated with an ISP. In some embodiments, the received request information can be associated with any suitable number of different ISPs (e.g., five, ten, and/or any other suitable number).

In some embodiments, process 200 can receive the request information in any suitable manner. For example, in some embodiments, information relating to an individual request to connect to a particular destination by a particular IoT device can be transmitted to process 200 by a cloud server(s), as described above in connection with 108 and 112 of FIG. 1. In some embodiments, process 200 can aggregate information relating to individual requests continuously as information is received.

At 204, process 200 can identify a particular destination that has been requested by a subset of IoT devices of the group of IoT devices that are associated with a first ISP. In some embodiments, process 200 can identify the particular destination in any suitable manner. For example, in some embodiments, process 200 can identify a particular destination that has been requested more than a predetermined number of times (e.g., more than ten times, more than one hundred times, and/or any other suitable number) and/or that has been requested more than a predetermined number of times within a predetermined time period (e.g., within the past hour, within the past two hours, and/or any other suitable time period). In some embodiments, the subset of IoT devices can include any suitable number (e.g., ten, one hundred, one million, and/or any other suitable number) of IoT devices that are included in the group of IoT devices. In some embodiments, each IoT device in the subset of IoT devices can be associated with the same first ISP. Note that, in some embodiments, each IoT device in the subset of IoT devices can be connected to a different router.

At 206, process 200 can determine a percentage of the group of IoT devices represented by the subset of IoT devices. That is, process 200 can determine the percentage of the group of IoT devices for which process 200 has received destination request information (as described above in connection with 202) that have requested a connection to the particular destination identified at 204. For example, in an instance where there are 1,000,000 IoT devices in the group of IoT devices and 100,000 of the IoT devices have requested connection to the particular destination identified at 204, process 200 can determine that 10% of the IoT devices in the group of IoT devices have requested connection to the destination site.

Note that, in some embodiments, process 200 can limit the group of IoT devices and/or the subset of IoT devices based on any suitable criteria. For example, in some embodiments, process 200 can limit the group of IoT devices to devices that are associated with the first ISP when calculating the percentage of the group of IoT devices represented by the subset of IoT devices. As another example, in some embodiments, process 200 can limit the subset of IoT devices to IoT devices that are devices of a particular type (e.g., appliances, media player devices, cameras, and/or any other suitable type of device) or that are manufactured by a particular vendor. As yet another example, in some embodiments, process 200 can limit the subset of IoT devices to IoT devices that have requested connection to the destination within any suitable time period (e.g., within the past hour, within the past two hours, within the past day, and/or any other suitable time period).

At 208, process 200 can determine a degree to which the particular destination identified at 204 is limited relative to other destinations requested by IoT devices associated with the first ISP. That is, in some embodiments, process 200 can determine whether requests to the particular destination identified at 204 represents a small or large portion of total requests. For example, in some embodiments, process 200 can determine a total number of destinations requested by IoT devices associated with the first ISP and a number of times the particular destination identified at 204 was requested, and can determine a percentage that the particular destination represents of the total number of requested destinations. As a more particular example, in an instance where 1,000,000 total destinations have been requested by IoT devices associated with the first ISP and the particular destination identified at 204 has been requested 200,000 times by IoT devices associated with the first ISP, process 200 can determine that the particular destination identified at 204 represents 20% of requests associated with the first ISP. Note that, in some embodiments, process 200 can determine percentages for any suitable number of particular destinations (e.g., one, two, three, and/or any other suitable number), for example, in instances where multiple particular destinations are potentially targets of a malicious attack.

Note that, in some embodiments, process 200 can determine the degree to which the particular destination identified at 204 is limited relative to other destinations requested by IoT devices associated with the first ISP by limiting IoT devices used in the determination based on any suitable criteria. For example, as described above in connection with 206 of FIG. 2, process 200 limit IoT devices used in the determination to IoT devices of a particular type, IoT devices manufactured by a particular vendor, and/or based on any other suitable device information. As another example, in some embodiments, process 200 can limit destination requests used in the determination to destinations requested over any suitable time period (e.g., within the past hour, within the past two hours, within the past day, and/or any other suitable time period).

At 210, process 200 can calculate a first level score that represents a likelihood that the requests by the subset of IoT devices to connect to the particular destination identified at 204 represent malicious activity. In some embodiments, process 200 can calculate the first level score based on any suitable information, such as the percentage of the group of IoT devices represented by the subset of IoT devices (e.g., as described above in connection with 206), a degree to which the particular destination identified at 204 is limited relative to other destinations requested by IoT devices associated with the first ISP (e.g., as described above in connection with 208), and/or any other suitable information. For example, in some embodiments, process 200 can calculate the first level score such that the first level score is proportional to the percentage of the group of IoT devices represented by the subset of IoT devices. As a more particular example, in some embodiments, the first level score can be higher in instances where the percentage of the group of IoT devices represented by the subset of IoT devices is higher. That is, in some embodiments, in instances where a relatively high percentage of IoT devices associated with the first ISP have all requested connection to the particular destination identified at 204, the first level score can be correspondingly higher. As another example, in some embodiments, process 200 can calculate the first level score such that the first level score is proportional to a percentage of all requested destinations that are requests to connect to the particular destination identified at 204. As a more particular example, in some embodiments, the first level score can be higher in an instance where requests to connect to the particular destination identified at 204 are 50% of all requested destinations compare to an instance where requests to connect to the particular destination are 20% of all requested destinations.

In some embodiments, process 200 can calculate the first level score based on any other suitable information. For example, in some embodiments, process 200 can calculate the first level score based on a duration of time over which requests to connect to the particular destination identified at 204 occurred by the subset of IoT devices. As a more particular example, in some embodiments, the first level score can be inversely proportional to a duration of time over which requests to connect to the particular destination occurred. As a specific example, the first level score can be higher in an instance where requests to connect to the particular destination occurred over thirty minutes relative compared to an instance where requests to connect to the particular destination occurred over two hours.

Note that, in some embodiments, the first level score can represent activity by IoT devices associated with the first ISP.

At 212, process 200 can calculate a second level score by modifying the first level score. In some embodiments, process 200 can modify the first level score based on any suitable information. For example, in some embodiments, process 200 can modify the first level score based on historical information associated with previous requested destination sites by IoT devices associated with the first ISP. As a more particular example, in some embodiments, the historical information can relate to previously detected malicious activity. As a specific example, in some embodiments, the historical information can indicate percentages of IoT devices associated with the first ISP that each requested a particular destination in instances where the requests for the particular destination were part of a malicious attack. As another specific example, in some embodiments, the historical information can indicate percentages of all requested destinations that were requests to connect to a particular destination under attack. As another example, in some embodiments, process 200 can modify the first level score based on historical information indicating a particular vendor associated with a particular type of IoT device. As a more particular example, in an instance where a particular vendor or model of a particular IoT device (e.g., of a particular type of IoT camera, of a particular type of IoT appliance, and/or any other suitable type of device) has previously been involved in one or more malicious attacks, process 200 can modify the first level score to be relatively higher. As yet another example, in some embodiments, process 200 can modify the first level score based on historical information indicating that particular IoT devices are known to belong to a particular unsecured domain or other unsecure condition, process 200 can modify a first level score associated with the particular IoT devices and/or similar IoT devices to be relatively higher.

In some embodiments, process 200 can modify the first level score based on the historical information in any suitable manner. For example, in instances where the historical information indicates that previously detected malicious activity was associated with similar request metrics (e.g., a similar percentage of IoT devices requesting a particular destination, a similar degree of limitedness of a requested destination, and/or any other suitable metrics), process 200 can modify the first level score to be higher. As another example, in instances where the historical information indicates that no malicious activity has been previously detected in association with similar request metrics (e.g., a similar percentage of IoT devices requesting a particular destination, a similar degree of limitedness of a requested destination, and/or any other suitable metrics), process 200 can modify the first level score to be lower. Note that, in some embodiments, the historical information can represent baseline activity or typical activity of requests by IoT devices. In some such embodiments, adjustment of the first level score can represent an adjustment of the first level score to account for the baseline activity or typical activity of requests by IoT devices.

Note that, in some embodiments, the first level score can be associated with a confidence score. In some such embodiments, the confidence score can be modified based on the historical information. For example, in an instance where a confidence score associated with the first level score initially indicates low confidence in the first level score, process 200 can modify the confidence score to be higher in instances where the historical information indicates that previously detected malicious activity was associated with request metrics similar to those used to calculate the first level score. As another example, in some embodiments, process 200 can modify the confidence score to be lower in instances where the historical information indicates that no malicious activity has been detected that was associated with request metrics similar to those used to calculate the first level score.

At 214, process 200 can calculate a global score based on the second level score calculated at 212 that is associated with the first ISP and second level scores associated with other ISPs. In some embodiments, the global score can indicate a degree to which malicious activity is widespread across multiple ISPs. In some embodiments, the second level scores associated with other ISPs can indicate metrics associated with similar requests by IoT devices associated with the other ISPs that have been aggregated by the threat server. For example, in some embodiments, the second level scores associated with other ISPs can be related to requests by IoT devices associated with the other ISPs that were to the same destination as the particular destination identified at 204.

In some embodiments, process 200 can calculate the global score in any suitable manner. For example, in some embodiments, process 200 can calculate the global score as an average of the second level score associated with the first ISP and the second level scores associated with other ISPs. In some such embodiments, individual second level scores used to calculate the global score can be weighted in any suitable manner and based on any suitable information. For example, in some embodiments, each second level score can be associated with a weight that indicates a number of IoT devices associated with the ISP. As a more particular example, a second level score associated with an ISP that is associated with a larger number of IoT devices can be associated with a correspondingly higher weight relative to other second level scores. As another example, in some embodiments, each second level score can be associated with a weight that indicates a recency of requests by IoT devices used to calculate the second level score. As a more particular example, a second level score calculated using requests from IoT devices that were received more recently can be associated with a weight that is higher relative to other second level scores.

In some embodiments, any of the first level score, the second level score, and the global score can be used by process 200 to identify malicious activity. For example, in some embodiments, in response to determining that any of the first level score, the second level score, and the global score exceed a predetermined threshold, process 200 can determine that requests to the particular destination identified at 204 by the subset of IoT devices are part of a malicious attack. In some embodiments, in response to determining that requests to the particular destination are part of a malicious attack, process 200 can perform any suitable actions, such as adding the destination to a list of blacklisted destinations that are not to be accessed (e.g., as described above in connection with 112 of FIG. 1). As another example, in some embodiments, in response to determining that any of the first level score, the second level score, and the global score are within a particular range (e.g., between a 40% and 60% likelihood indicating malicious activity, and/or any other suitable range), process 200 can cause instructions to be transmitted to routers associated with each of the subset of IoT devices to collect additional network activity information from IoT devices in the subset of IoT devices.

Note that, in some embodiments, process 200 can loop back to 206 and can recalculate any suitable metrics used to calculate the first level score, the second level score, and/or the global score. In some such embodiments, process 200 can thereby update a likelihood that requests to the destination identified at 204 are part of malicious activity. Additionally, in some embodiments, process 200 can determine that requests to access the destination identified at 204 are no longer to be analyzed in response to any suitable criteria, such as a determination that a percentage of IoT devices associated with a particular ISP requesting connections to the destination has dropped below a predetermined threshold, and/or any other suitable criteria.

Figure 3:
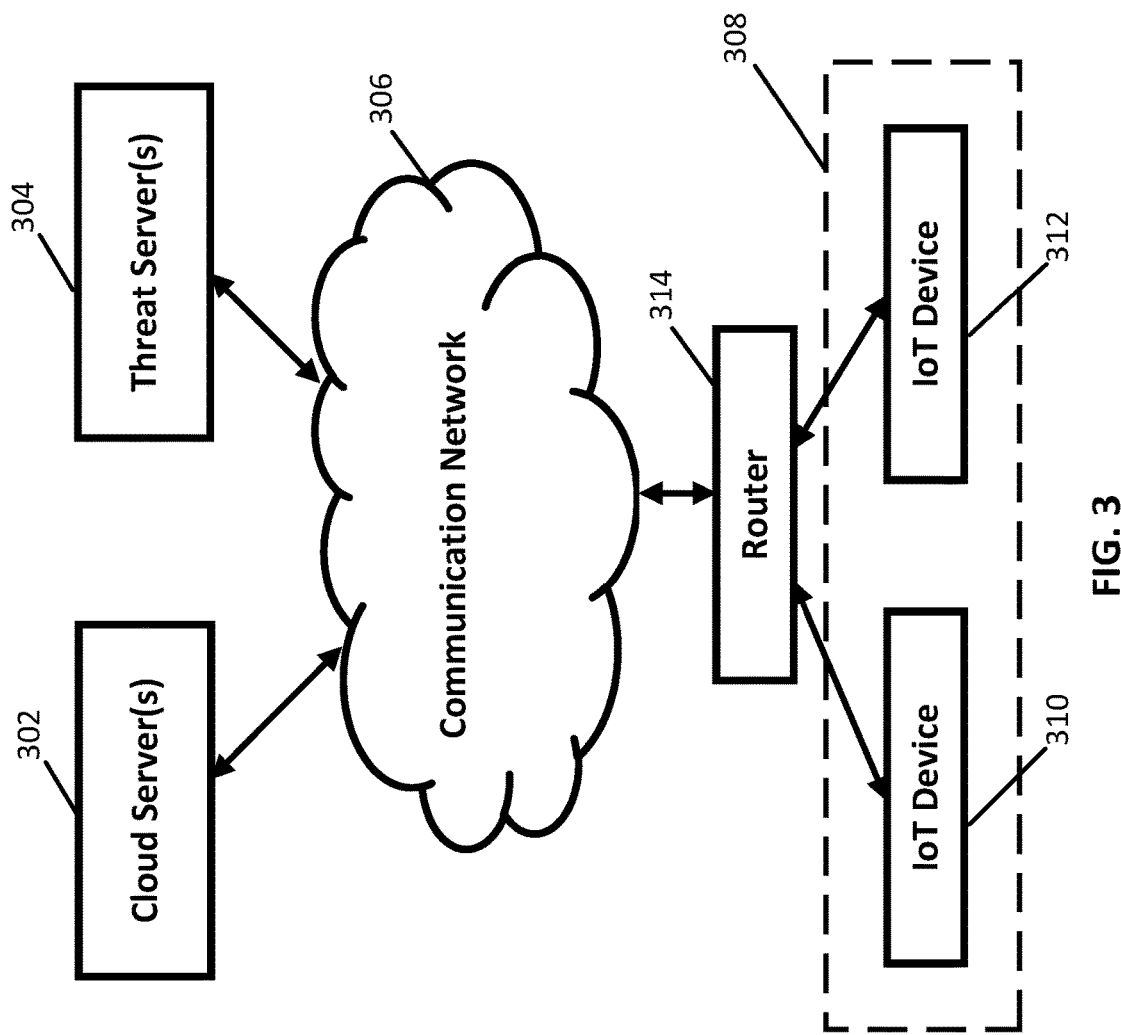
FIG. 3 shows a schematic diagram of an illustrative system suitable for implementation of mechanisms described herein for detecting malicious activity from IoT devices in accordance with some embodiments of the disclosed subject matter.

Turning to FIG. 3, an example 300 of hardware for detecting malicious activity by IoT devices that can be used in accordance with some embodiments of the disclosed subject matter is shown. As illustrated, hardware 300 can include one or more cloud servers 302, one or more threat servers 304, a communication network 306, one or more IoT devices 308, such as IoT devices 310 and 312, and/or a router 314. Note that, in some embodiments, cloud server(s) 302, threat server(s) 304, and/or router 314 can each be associated with a security service that performs any suitable functions, such as storing user-specified restrictions indicating sites that are to be blocked by devices using router 314, detecting malicious activity by any devices protected by the security service, and/or any other suitable functions.

Cloud server(s) 302 can be any suitable server(s) for storing information, data, programs, and/or any other suitable type of content for detecting malicious activity from IoT devices. For example, in some embodiments, cloud server(s) 302 can store information associated with a request from a particular IoT device using a particular ISP, such as a model of the IoT device, a vendor of the IoT device, and/or any other suitable information. As another example, in some embodiments, cloud server(s) 302 can store user-specified network restrictions, such as sites that are not to be accessed by devices connected to a particular router, and/or any other suitable restrictions. In some embodiments, cloud server(s) 302 can perform any suitable function(s), such as determining whether a request by an IoT device to access a particular destination site is to be blocked, based on, for example, user-specified restrictions, and/or any other suitable information, as described above in connection with FIG. 1.

Threat server(s) 304 can be any suitable server(s) for storing information, data, programs, and/or any other suitable content for detecting malicious activity by IoT devices. For example, in some embodiments, threat server(s) 304 can calculate one or more threat scores representing a likelihood that requests by multiple IoT devices to access particular destination is part of malicious activity, as described above in connection with FIGS. 1 and 2.

Communication network 306 can be any suitable combination of one or more wired and/or wireless networks in some embodiments. For example, communication network 306 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. In some embodiments, IoT devices 308 can be connected by one or more communications links to communication network 306 via router 314. In some embodiments, communication network 306 can be linked via one or more communications links to cloud server(s) 302 and/or threat server(s) 304. The communications links can be any communications links suitable for communicating data among IoT devices 308, cloud server(s) 302, and threat server(s) 304 such as network links, dial-up links, wireless links, hard-wired links, any other suitable communications links, or any suitable combination of such links.

IoT devices 308 can include any one or more IoT devices. For example, in some embodiments, IoT devices 308 can include devices such as smart appliances (e.g., smart thermostats, smart kitchen appliances, and/or any other suitable type of smart appliances), smart media devices (e.g., speakers, televisions, and/or any other suitable type of media playback devices), and/or any other suitable type of IoT devices.

Although server(s) 302 and 304 are each illustrated as one device, the functions performed by servers 302 and 304 can be performed using any suitable number of devices in some embodiments. For example, in some embodiments, multiple devices can be used to implement the functions performed by either of cloud server(s) 302 and/or threat server(s) 304.

Although two IoT devices 310 and 312 are shown in FIG. 2 to avoid over-complicating the figure, any suitable number of IoT devices, and/or any suitable types of IoT devices, can be used in some embodiments.

Figure 4:
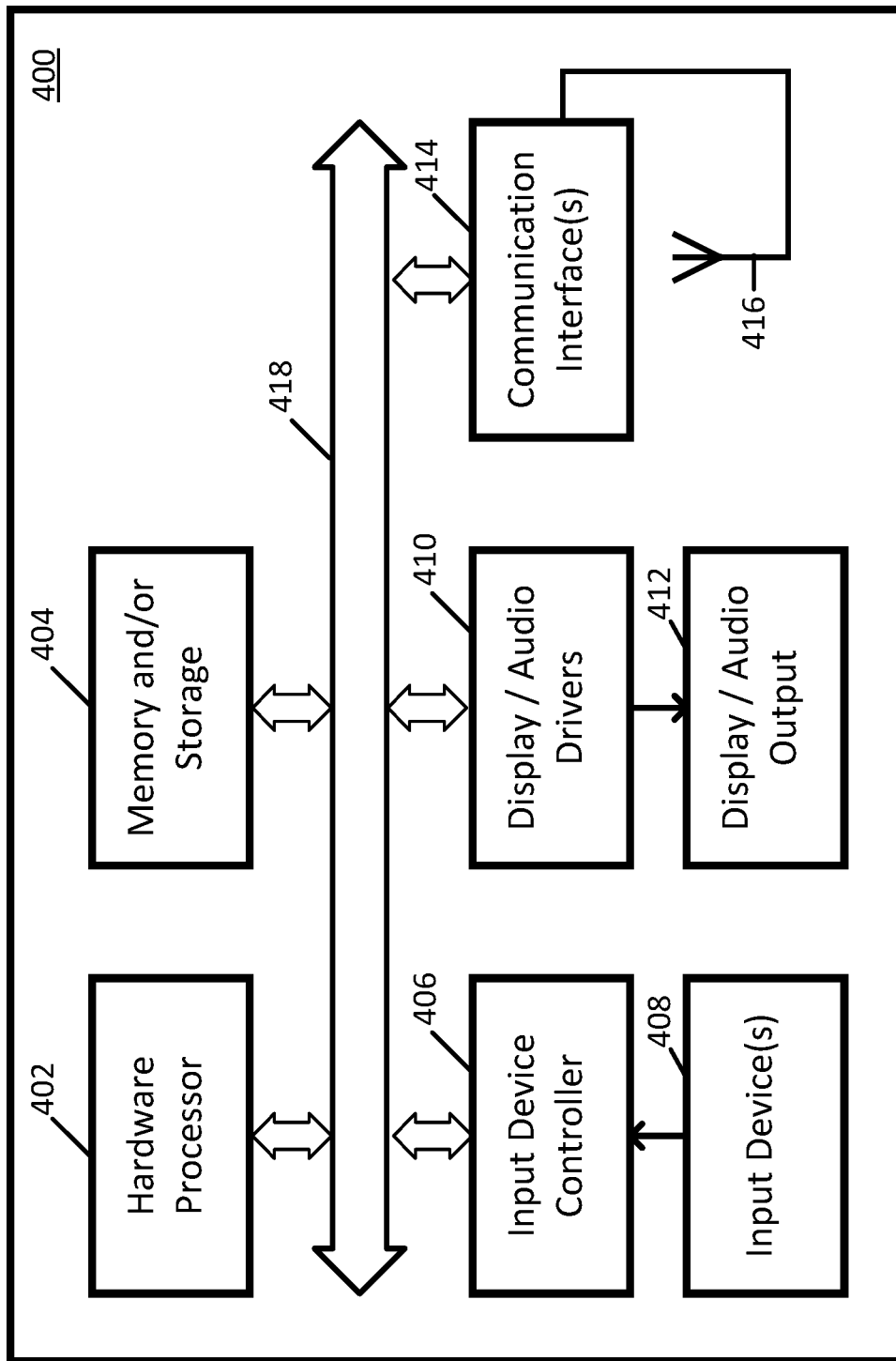
FIG. 4 shows a detailed example of hardware that can be used in a server and/or a user device of FIG. 3 in accordance with some embodiments of the disclosed subject matter.

Server(s) 302 and 304 and IoT devices 308 can be implemented using any suitable hardware in some embodiments. For example, in some embodiments, devices 302, 304, and 308 can be implemented using any suitable general-purpose computer or special purpose computer. For example, a smart appliance may be implemented using a special purpose computer. Any such general-purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Hardware processor 402 can include any suitable hardware processor, such as a microprocessor, a micro-controller, digital signal processor(s), dedicated logic, and/or any other suitable circuitry for controlling the functioning of a general-purpose computer or a special purpose computer in some embodiments. In some embodiments, hardware processor 402 can be controlled by a server program stored in memory and/or storage of a server, such as threat server 304. For example, in some embodiments, the server program can cause hardware processor 402 to determine a likelihood that activity by IoT devices is part of malicious activity as described above in connection with FIG. 2, and/or perform any other suitable functions.

Memory and/or storage 404 can be any suitable memory and/or storage for storing programs, data, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks (e.g., computer network 306). For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 306) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for detecting malicious activity from IoT devices are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for detecting malicious activity, comprising:
    receiving, at a first time point at a server from a first router connected to a first user device, first information indicating a first requested connection to a destination by the first user device that has been intercepted by the first router, wherein the first information indicates at least an identifier of the destination, and wherein, at the first time point, the first requested connection has not yet been classified as part of an attack;
    prior to allowing the first requested connection to the destination by the first user device:
        determining, using the first information, that the first requested connection to the destination by the first user device is part of an attack on the destination by the first user device and a plurality of other user devices, wherein determining that the first requested connection to the destination by the first user device is part of the attack on the destination comprises determining a count of a set of user devices including the first user device and the plurality of other user devices that have requested connections to the destination within a time window; and
        causing the first requested connection to be blocked in response to the determining that the first requested connection to the destination by the first user device is part of an attack on the destination; and
    causing a connection to the destination by a second user device to be blocked based on the determining that the first requested connection to the destination by the first user device is part of an attack on the destination.

2. The method of claim 1, wherein the attack on the destination is a distributed attack.

3. The method of claim 1, wherein the first information includes a type of device associated with the first user device.

4. The method of claim 1, wherein the plurality of other user devices and the first user device are each associated with a first Internet Service Provider (ISP).

5. The method of claim 1, wherein determining that the first requested connection to the destination by the first user device is part of an attack on the destination further comprises calculating a threat score that indicates a likelihood that the first requested connection to the destination by the first user device is part of the attack, and wherein determining that the first requested connection to the destination by the first user device is part of the attack is based on the threat score exceeding a predetermined threshold.

6. The method of claim 5, wherein the threat score is based on a duration of the time window.

7. The method of claim 1, wherein determining that the first requested connection to the destination by the first user device is part of the attack further comprises determining that a number of destinations for which the set of user devices have requested connections is less than a predetermined threshold.

8. A system for detecting malicious activity from Internet of Things (IoT) devices, the system comprising:
    a memory; and
    a hardware processor coupled to the memory that is configured to:
        receive, at a first time point from a first router connected to a first user device, first information indicating a first requested connection to a destination by the first user device that has been intercepted by the first router, wherein the first information indicates at least an identifier of the destination, and wherein, at the first time point, the first requested connection has not yet been classified as part of an attack;
        prior to allowing the first requested connection to the destination by the first user device:
            determine, using the first information, that the first requested connection to the destination by the first user device is part of an attack on the destination by the first user device and a plurality of other user devices, wherein determining that the first requested connection to the destination by the first user device is part of the attack on the destination comprises determining a count of a set of user devices including the first user device and the plurality of other user devices that have requested connections to the destination within a time window; and
            cause the first requested connection to be blocked in response to the determining that the first requested connection to the destination by the first user device is part of an attack on the destination; and
        cause a connection to the destination by a second user device to be blocked based on the determining that the first requested connection to the destination by the first user device is part of an attack on the destination.

9. The system of claim 8, wherein the attack on the destination is a distributed attack.

10. The system of claim 8, wherein the first information includes a type of device associated with the first user device.

11. The system of claim 8, wherein the plurality of other user devices and the first user device are each associated with a first ISP.

12. The system of claim 8, wherein determining that the first requested connection to the destination by the first user device is part of an attack on the destination further comprises calculating a threat score that indicates a likelihood that the first requested connection to the destination by the first user device is part of the attack, and wherein determining that the first requested connection to the destination by the first user device is part of the attack is based on the threat score exceeding a predetermined threshold.

13. The system of claim 12, wherein the threat score is based on a duration of the time window.

14. The system of claim 8, wherein determining that the first requested connection to the destination by the first user device is part of the attack further comprises determining that a number of destinations for which the set of user devices have requested connections is less than a predetermined threshold.

15. A non-transitory computer-readable medium containing computer-executable instructions that, when executed by a processor, cause the processor to perform a method for detecting malicious activity, the method comprising:
  receiving, at a first time point at a server from a first router connected to a first user device, first information indicating a first requested connection to a destination by the first user device that has been intercepted by the first router, wherein the first information indicates at least an identifier of the destination, and wherein, at the first time point, the first requested connection has not yet been classified as part of an attack;
  prior to allowing the first requested connection to the destination by the first user device:
    determining, using the first information, that the first requested connection to the destination by the first user device is part of an attack on the destination by the first user device and a plurality of other user devices, wherein determining that the first requested connection to the destination by the first user device is part of the attack on the destination comprises determining a count of a set of user devices including the first user device and the plurality of other user devices that have requested connections to the destination within a time window; and
    causing the first requested connection to be blocked in response to the determining that the first requested connection to the destination by the first user device is part of an attack on the destination; and
  causing a connection to the destination by a second user device to be blocked based on the determining that the first requested connection to the destination by the first user device is part of an attack on the destination.

16. The non-transitory computer-readable medium of claim 15, wherein the attack on the destination is a distributed attack.

17. The non-transitory computer-readable medium of claim 15, wherein the first information includes a type of device associated with the first user device.

18. The non-transitory computer-readable medium of claim 15, wherein the plurality of other user devices and the first user device are each associated with a first ISP.

19. The non-transitory computer-readable medium of claim 15, wherein determining that the first requested connection to the destination by the first user device is part of an attack on the destination further comprises calculating a threat score that indicates a likelihood that the first requested connection to the destination by the first user device is part of the attack, and wherein determining that the first requested connection to the destination by the first user device is part of the attack is based on the threat score exceeding a predetermined threshold.

20. The non-transitory computer-readable medium of claim 19, wherein the threat score is based on a duration of the time window.

21. The non-transitory computer-readable medium of claim 15, wherein determining that the first requested connection to the destination by the first user device is part of the attack further comprises determining that a number of destinations for which the set of user devices have requested connections is less than a predetermined threshold.

* * * * *